Feb. 23, 1937.   E. G. RAGATZ   2,071,429
FRACTIONATING METHOD AND APPARATUS
Filed Sept. 18, 1933
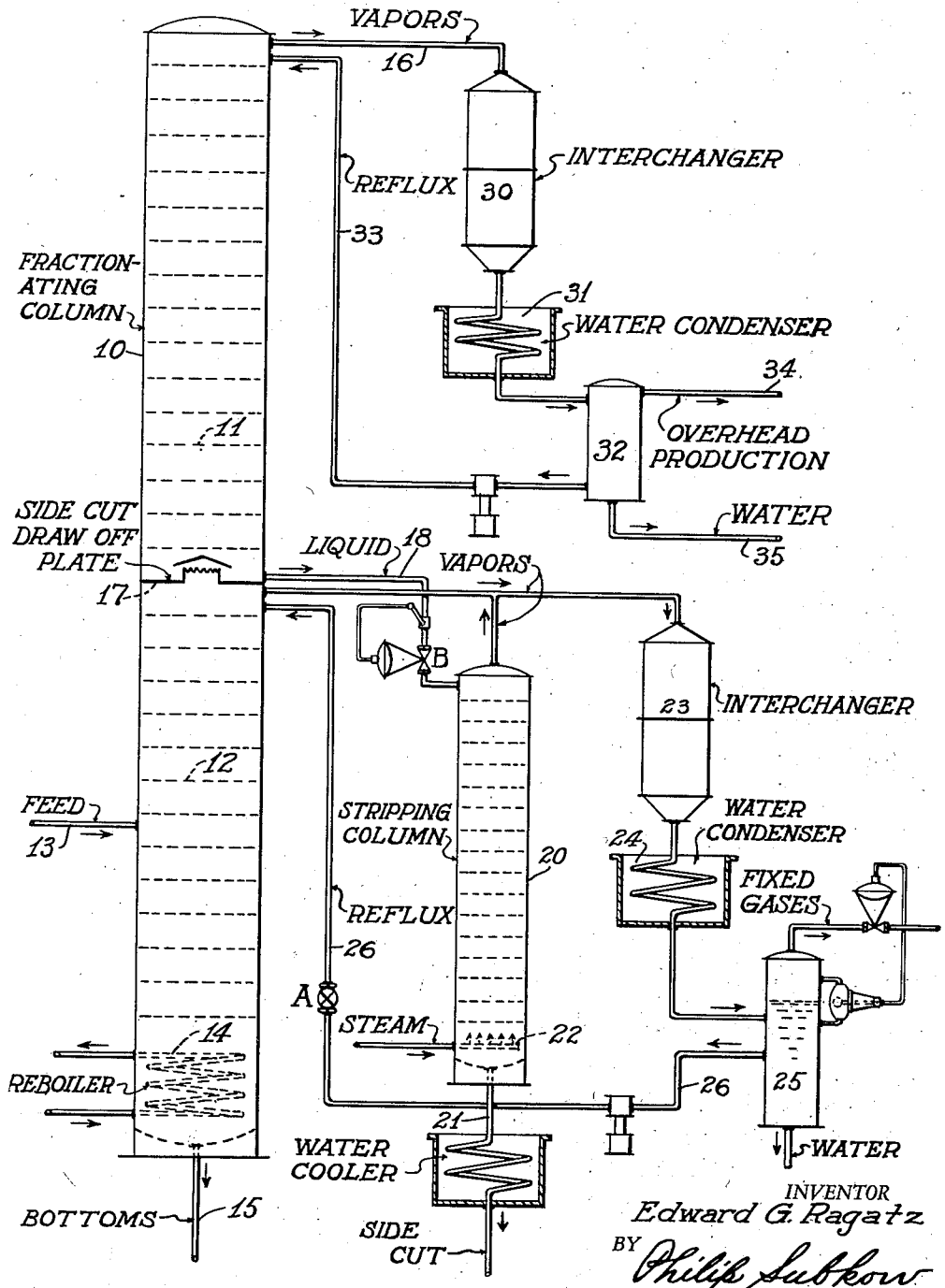
INVENTOR
Edward G. Ragatz
BY Philip Subkow
ATTORNEY.

Patented Feb. 23, 1937

2,071,429

UNITED STATES PATENT OFFICE 2,071,429

FRACTIONATING METHOD AND APPARATUS

Edward G. Ragatz, Los Angeles, Calif., assignor to Union Oil Company of California, Los Angeles, Calif., a corporation of California Application September 18, 1933, Serial No. 689,981

6 Claims. (Cl. 196—94)

This invention relates to fractionating methods and apparatus, and applies particularly to the fractionation of petroleum distillates.

The object of the invention is to provide means and a procedure suited to efficient separation and recovery of desired fractions, to avoid reflux overload in the upper section of a fractionating column especially where one or more side cuts are being taken off in lower sections of the column, and adapted further for economical recovery of heat.

Briefly stated, the invention comprises apparatus and operating steps wherein a liquid side cut is withdrawn from an intermediate portion of the column, the necessary refluxing for the heavier constituents of the side cut being effected within the corresponding sections of the fractionating column, and the refluxing in the top of the column being controlled so as to provide only that amount of reflux necessary for the condensation of the lightest liquid desired as a side cut, or for effectively fractionating the overhead cut. The invention also includes the further step of supplying the additional reflux necessary in the lower portion of the column to a point below the side cut draw-off plate by means of condensation of a quantity of vapors withdrawn from the column in the vicinity of the draw-off plate, this reflux supplementing any overflow of liquid to the lower or stripping portion of the column below the draw-off plate. The invention includes also the feature of increasing the available heat recovery by reason of the fact that the temperature of a heat interchanger in which the vapors from the side cut are condensed is much higher than the corresponding heat interchanger at the top of the apparatus, and, therefore, yields a much greater quantity of heat to the interchanging medium.

In the accompanying drawing wherein one embodiment of the invention is illustrated by way of example, the fractionating column 10 is shown as having a series of fractionating plates 11 in its upper portion and a series 12 in its lower portion to which the feed material is introduced by way of line 13. In the lower end of the column there may be provided a reboiler 14, the bottoms being withdrawn through line 15. From the top of the column the overhead vapors may be discharged through line 16. At an intermediate point in the column a draw-off plate 17 is provided, from above which a liquid side cut may be taken by way of line 18 and discharged into a stripping column 20 in which light vapors are dispelled and from which the liquid side cut is discharged as bottoms by way of line 21. At the bottom of the stripping column 20 steam may be introduced to assist the stripping action as indicated at 22.

The amount of side cut liquid withdrawn from the plate 17 is regulated by a temperature controlled valve B which in fact thereby acts as a means by which the quality of the side cut is controlled. The liquid not drawn off from the plate 17 overflows therefrom and serves as a reflux liquid to the plates 12 below the said draw-off plate 17. However, the action of the control valve B results in the withdrawal to the column 20 of such an amount of liquid that the overflow from plate 17 constitutes only a small portion of the reflux necessary. In order to supply this large deficiency in reflux liquid, vapors are withdrawn from the top plate 12 just below draw-off plate 17, and are passed, in conjunction with the overhead vapors from the stripper 20, to a vapor oil interchanger 23 in which the excess heat of the vapors is given up as a pre-heating medium for an oil feed or the like (not indicated). These vapors then pass through a condenser 24 to a separator 25 adapted to discharge fixed gases from the top thereof, water from the bottom thereof, and condensed reflux from the side thereof through a line 26 whence it is pumped through an automatically or manually adjusted valve A as reflux to the top of the lower section 12 of fractionating column 10. In this manner the condensed vapors withdrawn from the top of the section 12 to the interchanger 23 are made to provide the deficiency of reflux liquid in the section 12 occasioned by the withdrawal of the side cut liquid through the line 18. Or it may be considered, if desired, that the reflux passed by the manually controlled valve A provides a deficient quantity and the temperature control valve B is set so that a sufficient overflow from the plate 17 is insured to make up the deficiency effected by the setting of valve A.

By withdrawing vapors from the top of the section 12 and condensing them to provide the reflux as above described, the common overloading of the upper section of a fractionating column from which one or more side cuts are drawn is avoided. This overloading which has resulted from previous practice was occasioned by the excessive quantities of reflux necessary to be introduced into the top of the column in order to insure adequate condensation of all fractions desired to be withdrawn as side cuts from lower regions of the column. At the same time the elimination of steam in separator 25 further avoids overloading which would result if the vapors from stripper 20 were returned to column 10.

According to the present arrangement and procedure the return of reflux condensate obtained from the vapors withdrawn from the top of the column 10 through the line 16 is limited to an amount only sufficient to insure adequate condensation of the lightest liquid to be withdrawn in the side cut or cuts or for effectively fractionating the overhead cut. This reflux may be obtained in any satisfactory manner, such as by passage of vapors taken through the line 16 into a vapor oil interchanger 30 which discharges to a water condenser 31 and thence to a separator 32, a part of the condensate being used as the necessary reflux which is returned through the line 33 to the top of the column 10 at the upper end of the fractionating section 11. The overhead product after withdrawal of the necessary reflux is discharged to storage by line 34, and any condensed steam is eliminated by way of discharge 35.

From the foregoing it will be apparent that a satisfactory means of avoiding overload on the upper plates due to excessive quantities of reflux required for condensing heavier components in the fractionating column from which side cuts are to be withdrawn, is avoided by the present invention by reason of the production of a reflux for the lower plates from material extracted from suitable intermediate portions of the column such as from below a draw-off plate for a corresponding side cut. In this manner each section of the fractionating column is required to handle only that reflux load which is necessary for its own operation and is not required to handle any additional reflux load which would be necessary for a proper condensation of heavy fractions in the lower portions of such fractionating columns. It is apparent also that proper control of the reflux in the lower sections may be readily and automatically accomplished as by means of the temperature control on the valve B.

The foregoing is not to be taken as limiting but merely illustrative of one form of carrying out my invention as many variations can be made by a man skilled in the art within the scope of the invention.

I claim:

1. A method for fractionating hydrocarbon oils comprising introducing a heated hydrocarbon feed material into a lower portion of a fractionating column, withdrawing vapors from the top of the column, returning reflux to the upper portion of the column, withdrawing a liquid side cut from an intermediate portion of the column, introducing said withdrawn side cut into a stripping column, vaporizing a portion of said side cut in said stripping column, withdrawing vapors from said stripping column, and augmenting them with vapors withdrawn from an intermediate portion of the fractionating column, condensing the thus augmented vapors and returning a portion of the condensate to an intermediate portion of the fractionating column.

2. A method according to claim 1 in which the reflux in the upper portion of the fractionating column is limited in quantity to that required for condensation of the lightest fraction in the withdrawn side cut and effective fractionation of the overhead vapors from the column.

3. A method according to claim 1 wherein the amount of the liquid side cut withdrawn from the column is regulated by the temperature of the said withdrawn cut, and the reflux to the intermediate portion of the column is limited to the quantity necessary to combine with the overflow from the side-cut draw-off point for proper fractionation therebelow.

4. A method for fractionating hydrocarbon oils comprising introducing a heated hydrocarbon feed material into a lower portion of a fractionating column, withdrawing vapors from the top of the column, returning reflux to the upper portion of the column, withdrawing a liquid side cut from an intermediate portion of the column, vaporizing a portion of the said withdrawn liquid side cut in a vaporizing zone, withdrawing vapors from an intermediate portion of the fractionating column, commingling the vapors from the said vaporizing zone resulting from the vaporization of a portion of the said withdrawn liquid side cut with the said vapors withdrawn from the fractionating column, condensing the resulting commingled vapors and returning a portion of the condensate to an intermediate point in the fractionating column, and withdrawing unvaporized liquid side cut from the said vaporizing zone.

5. A method for fractionating hydrocarbon oils comprising introducing a heated hydrocarbon feed material into a lower portion of a fractionating column, withdrawing vapors from the top of the column, returning reflux to the upper portion of the column, withdrawing a liquid side cut from an intermediate portion of the column, introducing said withdrawn liquid side cut into a stripping column, vaporizing a portion of said side cut in said stripping column, withdrawing vapors from said stripping column, and augmenting them with vapors withdrawn from the fractionating column at a point below the point of withdrawal of the liquid side cut, condensing the thus augmented vapors and returning a portion of the condensate to the fractionating column at a point below the point of withdrawal of the liquid side cut.

6. A fractionating apparatus for petroleum distillates comprising a fractionating column, an intermediate plate therein comprising a draw-off plate for a liquid side cut, a liquid feed to the lower portion of the column, means for withdrawing vapors from the top of the column and returning a condensate therefrom to the upper portion of the column as reflux, means for withdrawing a side cut from said draw-off plate, a side cut stripping column connected to receive the said liquid side cut, means for withdrawing vapors from an intermediate portion of the column, means for condensing the last mentioned vapors and returning them as reflux to the column at a point adjacent to said draw-off plate, means for supplying steam to said stripping column, means for conducting the vapors from the stripping column to the condenser for the vapors withdrawn from the intermediate portion of the fractionating column, and water draw-off means connected with said condenser means.

EDWARD G. RAGATZ.